United States Patent
Serra et al.

(10) Patent No.: US 7,025,103 B2
(45) Date of Patent: Apr. 11, 2006

(54) TIRE FOR A VEHICLE WHEEL HAVING AN ANTIABRASIVE BAND

(75) Inventors: Antonio Serra, Genoa (IT); Marco Nahmias Nanni, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 191 days.

(21) Appl. No.: 10/203,966

(22) PCT Filed: Feb. 7, 2001

(86) PCT No.: PCT/EP01/01284

§ 371 (c)(1),
(2), (4) Date: Nov. 4, 2002

(87) PCT Pub. No.: WO01/60643

PCT Pub. Date: Aug. 23, 2001

(65) Prior Publication Data

US 2003/0141000 A1     Jul. 31, 2003

Related U.S. Application Data

(60) Provisional application No. 60/185,121, filed on Feb. 25, 2000.

(30) Foreign Application Priority Data

Feb. 21, 2000   (EP) ................................. 00200585
Feb. 25, 2000   (US) ................................. 60/185,121

(51) Int. Cl.
*B60C 15/00*     (2006.01)
*B60C 15/06*     (2006.01)

(52) U.S. Cl. ...................... 152/543; 152/539; 152/547

(58) Field of Classification Search ................ 152/539, 152/541, 542, 543, 547, 555
See application file for complete search history.

(56) References Cited

U.S. PATENT DOCUMENTS 3,836,412 A   *   9/1974   Boustany et al. .......... 156/62.2
4,319,619 A     3/1982   Kozima et al.

(Continued)

FOREIGN PATENT DOCUMENTS

EP     0 501 227     9/1992

(Continued)

OTHER PUBLICATIONS

Locatelli et al.; "Black to the Future"; Tire Technology International, pp. 50-55, (1999).

*Primary Examiner*—Jeff H. Aftergut
*Assistant Examiner*—Justin R. Fischer
(74) *Attorney, Agent, or Firm*—Finnegan, Henderson, Farabow, Garrett & Dunner, L.L.P.

(57) ABSTRACT

An antiabrasive band includes a vulcanized elastomeric compound including at least one natural or synthetic rubber. A value of a loss factor of the compound at 70° C. is less than or equal to 0.130. A value of a storage modulus of the compound at 70° C. is greater than or equal to 6 MPa. A tire for a vehicle wheel is also disclosed, including at least one carcass ply and a pair of beads. A first edge of the at least one carcass ply is folded externally around one or more first bead wires and a second edge of the at least one carcass ply is folded externally around one or more second bead wires. Each bead includes one or more respective bead wires, a bead filling, and the antiabrasive band.

26 Claims, 1 Drawing Sheet

U.S. PATENT DOCUMENTS 5,023,292 A * 6/1991 Hong et al. .................. 524/432
5,362,793 A    11/1994 Garro et al.
5,397,519 A * 3/1995 Majumdar .................. 264/115
5,929,157 A     7/1999 Matsuo

FOREIGN PATENT DOCUMENTS

| | | | |
|---|---|---|---|
| EP | 0604833 | * | 7/1994 |
| EP | 0 906 838 | | 4/1999 |
| EP | 0 964 026 | | 12/1999 |
| GB | 2 213 825 | | 8/1989 |
| JP | 60-82409 | * | 10/1983 |
| JP | 01175509 | * | 7/1989 |
| JP | 07-315015 | | 12/1995 |
| JP | 7-315015 | * | 12/1995 |

* cited by examiner

TIRE FOR A VEHICLE WHEEL HAVING AN ANTIABRASIVE BAND

CROSS-REFERENCE TO RELATED APPLICATIONS

This application is a national stage entry under 35 U.S.C. § 371 from International Application No. PCT/EP01/01284, filed Feb. 7, 2001, in the European Patent Office, the contents of which are relied upon and incorporated herein by reference; additionally, Applicants claim the right of priority under 35 U.S.C. § 119(a)–(d) based on patent application No. 00200585.8, filed Feb. 21, 2000, in the European Patent Office; further, Applicants claim the benefit under 35 U.S.C. § 119(e) based on prior-filed, copending provisional application No. 60/185,121, filed Feb. 25, 2000, in the U.S. Patent and Trademark Office.

BACKGROUND OF THE INVENTION

1. Field of the Invention

The present invention relates to a motor vehicle tyre with an antiabrasive band which is capable of reducing its rolling resistance (R.R.).

2. Description of the Related Art

One of the most urgent requirements on the part of motor vehicle constructors regarding the performance qualities of tyres is that of a low R.R.

As a result of this requirement, tyre constructors have hitherto made strenuous efforts to reduce the R.R. without negatively affecting other important characteristics such as the handling, the comfort and the durability.

Among the various components which constitute a tyre, the one which most greatly influences the R.R. is clearly the tread band, since it is the component which comes into direct contact with the ground.

Thus, in recent years, efforts of experts in the field have been concentrated on modifications to the tread compound. In particular, it has been sought to modify the hysteresis properties of the tread compounds, in particular by varying the loss factor, which is defined as $\tan \delta = E''/E'$, in which $E'$=storage modulus and $E''$=loss modulus. This is because it is thought that an optimum compromise between a low R.R. and good road holding of the tyre on wet surfaces would be obtained with a compound having a low value of $\tan \delta$ at moderate temperatures (50–70° C.) and a high value of $\tan \delta$ at low temperatures (0–10° C.).

In this context, a particularly significant change in the hysteresis behaviour of the compounds was obtained by totally or partially replacing the conventional reinforcing fillers based on carbon black with so-called "white fillers" and in particular with silica (see, for example, patent EP-501 227).

Besides this, attempts have been made to improve the R.R. by modifying the compound used for the tread underlayer and for the carcass plies or for the side walls of the tyre.

U.S. Pat. No. 4,319,619 describes a radial tyre in which the rubber portion of at least one carcass ply and of the tread underlayer are made of a rubber which has a viscoelastic property $\tan \delta \leq 0.2$ and a storage modulus $\geq 120$ Kg/cm². In this tyre, the R.R. would be reduced without degrading the handling in terms of braking, stability, comfort and wear resistance.

According to U.S. Pat. No. 5,929,157, the R.R. of a tyre can be reduced without reducing the wear resistance or the handling on wet ground and without increasing the electrical resistance of the tyre as a whole if the compound for the side wall of the tyre is produced using, as reinforcing filler, a particular type of carbon black, replacing some of the carbon black with a particular type of silica and, particularly, using a specific amount of a silane as coupling agent (col. 1, lines 32–39).

It is commonly perceived that the hysteresis properties of other parts of the tyre do not have a particularly significant influence on the overall R.R. of the tyre. This view is confirmed by calculations on models produced by analysis of the finished components [see, for example, J. L. Locatelli and Y. De Puydt in "Tire Technology International" (June 1999, pp. 50–55)].

Changing other parts of the tyre to reduce the R.R. is moreover discouraged by the fact that obtaining only a modest improvement in the R.R. entails running the risk of compromising other important characteristics and, thus, of impairing the overall performance qualities of the tyre.

This is particularly true for the antiabrasive band, which needs to have properties that are in direct opposition to the changes which may be envisaged for reducing the R.R. The reason for this is that, as is known, the antiabrasive band is a component made of elastomeric material which forms part of the tyre bead and is placed in a position axially external to the carcass fold. Once the tyre is mounted on the wheel rim, the antiabrasive band then lies between the carcass fold and the rim and serves mainly to protect the carcass fold from the continuous deformational and frictional stresses exerted by the rim on the bead.

Considering its position and its function, it conventionally consists of a compound whose storage modulus is high enough not to make it a mechanically heterogeneous component relative to the bead. At the same time, this compound must also have wear resistance and fatigue strength values which are such that they allow the antiabrasive band to exercise the abovementioned protective function efficiently.

In general, an antiabrasive band compound comprises 30–70 phr of natural rubber, 30–70 phr of BR (polybutadiene), 0–20 phr of SBR (styrene/butadiene copolymer), at least 80 phr of carbon black, a large amount of sulphur (at least 2 phr) and a large amount of oil (about 15 phr). The combined use of large amounts of carbon black and sulphur gives the compound high storage modulus E' values at high temperatures (70 and 100° C.).

In the course of the present description and in the claims which follow, the expression phr (per hundred rubber) means that the weights of the various components of the compound are relative to 100 parts of rubber.

Typically, an antiabrasive band compound conventionally has the following physical properties: modulus E' at 70° C.=7.5–8.5 MPa; $\tan \delta$ at 70° C.=0.15–0.20; DIN abrasion $\leq 30$ mm³.

SUMMARY OF THE INVENTION

The Applicant has now found that it is possible to make changes to the antiabrasive band compound which reduce the R.R. of a tyre without compromising the typical performance qualities of this structural component of the tyre.

The Applicant has also found that the abovementioned objective can be achieved by means of a compound with a loss factor ($\tan \delta = E''/E'$) at 70° C. $\leq 0.130$ and a storage modulus E' at 70° C. $\geq 6$ MPa. In a first aspect, the present invention thus relates to a motor vehicle tyre which has reduced rolling resistance, the said tyre comprising at least one carcass ply whose opposite lateral edges are folded externally to form carcass folds around respective right and left bead wires, each bead wire being enclosed in a respective bead, each bead also comprising a respective bead filling and antiabrasive band, the said antiabrasive band consisting of a vulcanized elastomeric compound comprising at least one natural or synthetic rubber, characterized in that the said compound has a loss factor (tan δ=E"/E') at 70° C.≦0.130 and a storage modulus E' at 70° C.≧6 MPa.

In a second aspect, the present invention also relates to an antiabrasive band for a tyre which has low rolling resistance, the said band consisting of a vulcanized elastomeric compound comprising at least one natural or synthetic rubber, characterized in that the said compound has a loss factor (tan δ=E"/E') at 70° C.≧0.130 and a storage modulus E' at 70° C.≧6 MPa.

Preferably, the value of the said loss factor at 70° C. is between 0.05 and 0.120 and even more preferably between 0.08 and 0.110.

In turn, the value of the said storage modulus E' at 70° C. is preferably between 6.5 and 18 MPa and even more preferably between 7 and 12 MPa.

Typically, DIN abrasion of the compound for the antiabrasive band of the present invention is less than 70 mm³. It is preferably less than 60 mm³.

In one preferred embodiment of the present invention, the said low values for the loss factor are obtained by adding to a natural and/or synthetic rubber a small amount of carbon black and an effective amount of a component capable of increasing the value of the storage modulus E' at 70° C. of the vulcanized compound.

Preferably, the said small amount of carbon black is ≦60 phr and even more preferably ≦50 phr.

Advantageously, the said component which is capable of increasing the value of the storage modulus E" at 70° C. is a thermosetting resin chosen from the group comprising resorcinol/methylene-donating-compound resins, epoxy resins, alkyd resins and mixtures thereof.

The amount of thermosetting resin which gives an antiabrasive band compound the typical characteristics of the present invention varies from one case to another according to parameters that are well known to those skilled in the art, such as, for example, the number of crosslinking groups present in the thermosetting resin used and/or its nature (containing two components or in precondensed form). A person skilled in the art will thus be capable of determining the amount of thermosetting resin required for the purposes of the present invention, on a case-by-case basis, by means of simple routine experimental tests.

Typically, the amount of thermosetting resin is between 0.5 and 15 phr, or preferably between 2 and 10 phr and even more preferably between 3 and 7 phr.

Preferably, the said thermosetting resin is of the type: resorcinol+methylene donor or is in the form of two components which form the thermosetting resin in situ, or is in precondensed form (condensed before being added to the compound). Typically, the methylene donor is hexamethoxymethylmelamine (HMMM) or hexamethylenetetramine (HMT). In the case of HMMM, its weight ratio relative to the resorcinol ranges from 0.5 to 3.

Alternatively, thermosetting resins of other types can also be used, such as, for example, epoxy/polyol, epoxy/diamine, epoxy/carboxylic acid or alcohol/diacid (alkyl resins). In this case also, the two components which condense in situ can be added to the compound or the resin precondensed separately can be added.

Typically, the synthetic rubber is a diolefinic elastomeric polymer which can be obtained by polymerization, in solution or in emulsion, of one or more conjugated diene monomers, optionally mixed with a vinylaromatic hydrocarbon, the latter being present in the polymer in amounts generally not greater than 50% by weight relative to the total weight of the polymer.

Preferably, the diene elastomeric polymer contains from 30 to 70% by weight, relative to the total weight of the polymer, of diolefinic units of 1,2 structure.

For the purposes of the invention, the conjugated diene monomer is preferably chosen from the group comprising: 1,3-butadiene, isoprene, 2,3-dimethyl-1,3-butadiene, 1,3-pentadiene, 1,3-hexadiene and mixtures thereof, while the vinylaromatic hydrocarbon is preferably chosen from the group comprising: styrene, α-methylstyrene, p-methylstyrene, vinyltoluene, vinylnaphthalene, vinylpyridine and mixtures thereof.

In the course of the present description, the expression "diolefinic units of 1,2 structure" is used to denote the fraction of units derived from the 1,2 polymerization of the conjugated diene monomer. For example, when the conjugated diene monomer is 1,3-butadiene, the abovementioned diolefinic units of 1,2 structure have the following structural formula:

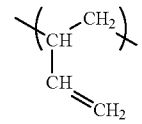

Preferably, the diolefinic elastomeric polymer is chosen from the group comprising styrene/1,3-butadiene (SBR) copolymers, poly(1,3-butadiene) (BR), styrene/isoprene copolymers and the like, or mixtures thereof.

Typical examples of carbon black are those identified by the abbreviations N110, N121, N134, N220, N231, N234, N299, N330, N339, N347, N351, N358 and N375 according to the ASTM standards.

Needless to say, the antiabrasive band compound according to the present invention also comprises sulphur and/or other vulcanizing agents of conventional type.

In addition, the antiabrasive band compound of the present invention can also comprise other additives of conventional type, such as activating agents, plasticizers, antioxidants, accelerators and the like.

The Mooney viscosity ML(1+4) at 100° C. to which reference is made in the course of the present description was determined according to ISO standard 289/1.

Other physical properties of the compounds to which reference is made in the course of the present description and in the claims were determined on samples of compound (vulcanized beforehand at 151° C. for 30 minutes) according to the following conventional standards:

hardness in degrees IRHD: ISO standard 48;
DIN abrasion values (expressed as relative volumetric loss relative to a standard composition): ISO 4649.

The elastic properties were measured under dynamic conditions.

More particularly, the storage modulus E', loss modulus E" and tan δ=E'/E" values were determined using apparatus commercially available from Instron.

The dynamic Instron determinations were carried out under the following conditions:

cylindrical test sample (25 mm in length and 14 mm in diameter),
predeformation: 20%,
imposed deformation: 7.5%,
frequency: 100 Hz.

The characteristics of the compound of the present invention cannot be obtained simply by modifying the amounts of the components of the antiabrasive band compound of conventional type mentioned above. The reason for this is that it is not possible to reduce the hysteresis (tan δ) by reducing the amount of oil, since this increases its viscosity, thus compromising its processability. Nor is it possible to reduce the amount of carbon black present in the said conventional compound since this reduction brings about a reduction in the storage modulus E' which cannot be compensated for by increasing the amount of sulphur. In point of fact, the amount of sulphur present in this compound is already at the maximum level permitted to avoid reversion.

BRIEF DESCRIPTION OF THE DRAWINGS

The characteristics and advantages of the invention will now be illustrated with reference to an embodiment given by way of non-limiting example in the attached FIG. 1, which represents a view in cross-section of a portion of a tyre made according to the invention.

DETAILED DESCRIPTION OF THE PREFERRED EMBODIMENTS

Figure 1:
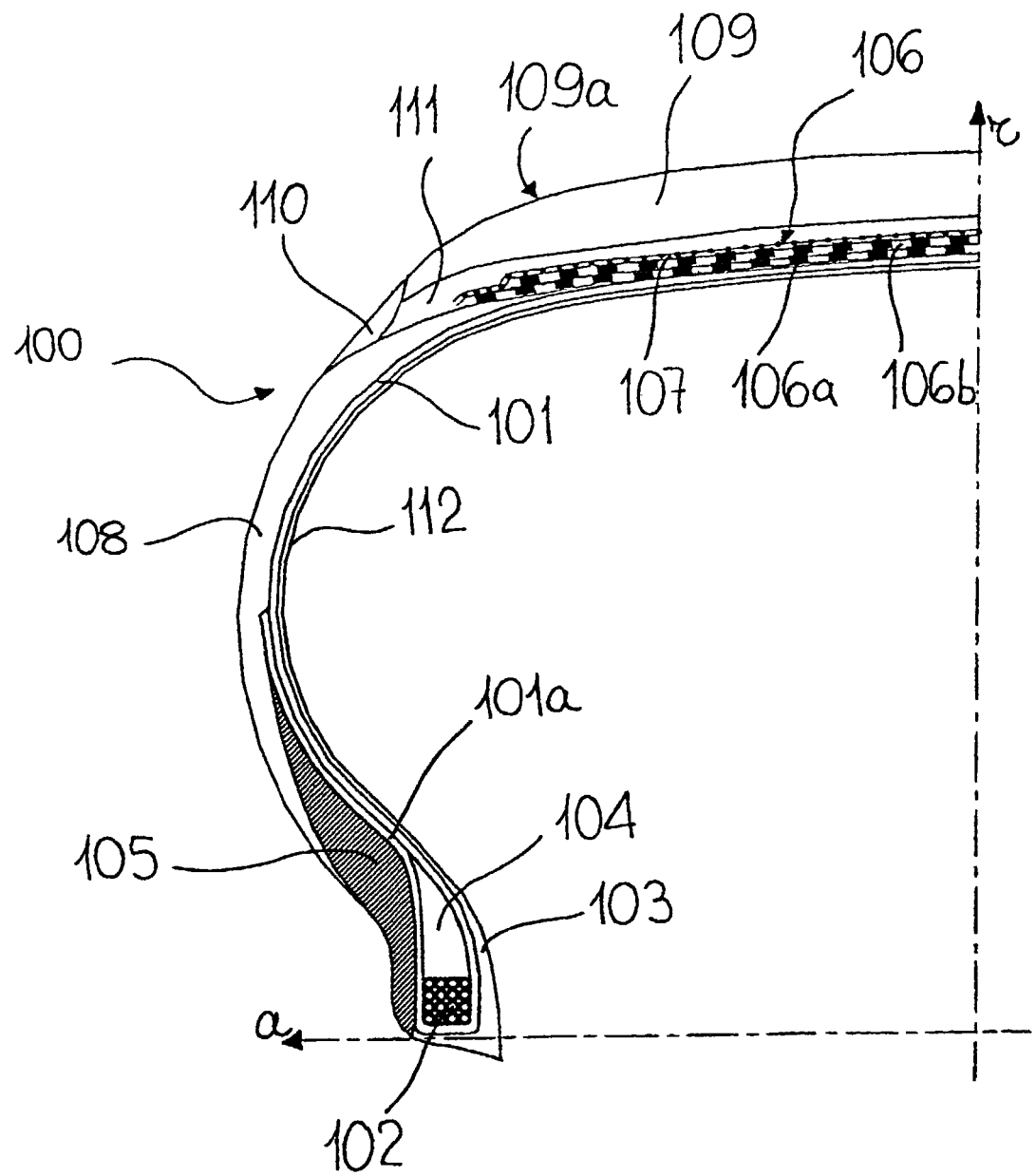

"a" indicates an axial direction and "r" indicates a radial direction. For simplicity, FIG. 1 represents only a portion of the tyre, the remaining portion not represented being identical and symmetrically disposed relative to the radial direction "r".

The tyre (100) comprises at least one carcass ply (101) whose opposite lateral edges are folded externally to form the so-called carcass folds (101a) around respective bead wires (102).

The carcass ply (101) is usually of radial type, i.e. it incorporates reinforcing cords arranged in a substantially perpendicular direction relative to a circumferential direction. Each bead wire (102) is enclosed in a bead (103) defined along an inner circumferential edge of the tyre (100), via which the tyre is attached to a rim (not represented in FIG. 1) forming part of a vehicle wheel. The space defined by each carcass fold (101a) contains a bead filling (104) in which the bead wires (102) are embedded. The antiabrasive band (105) according to the present invention is placed in an axially external position relative to the carcass fold (101a).

A belt structure (106) is applied along the circumference of the carcass ply (101). In the specific embodiment in FIG. 1, the belt structure (106) comprises two belt strips (106a, 106b) which incorporate a plurality of reinforcing cords, typically made of metal, which are parallel to each other in each strip and run transverse to those in the adjacent strip, oriented in such a way as to form a predetermined angle relative to a circumferential direction. At least one reinforcing layer (107) can optionally be applied at zero degrees to the radially outermost belt strip (106b), this reinforcing layer generally incorporating a plurality of reinforcing cords, typically textile cords, arranged at an angle of a few degrees relative to a circumferential direction.

A side wall (108) is also applied externally on the carcass ply (101) and extends, in an axially external position, from the bead (103) to the extremity of the belt structure (106).

A tread band (109), whose lateral edges are connected to the side walls (108), is applied circumferentially in a position radially external to the belt structure (106). Externally, the tread band (109) has a rolling surface (109a) designed to come into contact with the ground. This surface (109a) which, for the sake of simplicity, has been shown smooth in FIG. 1, generally comprises circumferential grooves linked by transverse cuts (not represented) so as to define a plurality of blocks of various shapes and sizes distributed over the rolling surface (109a).

A strip of rubber (110) (referred to as a "mini-sidewall") can optionally be present in the connection zone between the side walls (108) and the tread band (109), this strip of rubber generally being obtained by being co-extruded with the tread band, and making it possible for the mechanical interaction between the tread band (109) and the side walls (108) to be improved. Alternatively, the end part of the side wall (108) can directly cover the lateral edge of the tread band (109). An underlayer (111) can optionally be placed between the belt structure (106) and the tread band (109) so as to form, with the tread band (109), a structure known as a "cap and base".

In the case of tyres without an air chamber (tubeless tyres), a rubberizing layer (112)—generally referred to as a "liner"—can further be provided in a radially internal position relative to the carcass ply (101), this liner providing the impermeability to air required to inflate the tyre.

The tyre according to the present invention can be produced by any process known in the art, including at least one stage of manufacturing the raw tyre and at least one stage of vulcanizing it.

More particularly, the process for producing the tyre comprises the stages of prior and separate preparation of a series of semi-finished products corresponding to the various parts of the tyre (carcass plies, belt structure, bead wires, fillings, side walls and tread band) which are then assembled together by means of suitable manufacturing machinery. Next, the subsequent vulcanization stage seals the abovementioned semi-finished components together to give a monolithic block, which is the finished tyre.

Needless to say, the stage for the preparation of the abovementioned semi-finished components is preceded by a stage of preparation and moulding of the relevant compounds constituting the said semi-finished components, according to conventional techniques.

In particular, in the tyres of the invention, the antiabrasive band can be produced from the corresponding compound as a separate component and then combined with the other components during the manufacturing stage. Preferably, the antiabrasive band is produced by co-extrusion together with the side wall.

The raw tyre thus obtained is then put through the subsequent stages of moulding and vulcanization. For this purpose, a vulcanizing mould is used which is designed to receive the tyre being processed inside a moulding cavity having countershaped walls which define the outer surface of the tyre once crosslinking is complete. The moulding of the raw tyre can be carried out by injecting a pressurized fluid into the space defined by the internal surface of the tyre, so as to press the outer surface of the raw tyre against the walls of the mould cavity. At this point, the stage of vulcanization of the crude elastomeric material present in the tyre is carried out. For this purpose, the outer wall of the vulcanizing mould is placed in contact with a heating fluid (generally steam) such that the outer wall reaches a maximum temperature generally of between 100° C. and 200° C. At the same time, the internal surface of the tyre is brought to the vulcanizing temperature using the same pressurized fluid used to press the tyre against the walls of the mould cavity. Once the vulcanization is complete, the tyre is removed from the vulcanizing press.

The antiabrasive band (105) is formed from a compound according to the invention which has a loss factor at 70° C.

(tan δ=E"/E')=0.103, a storage modulus at 70° C. (E')=7.65 MPa, and the composition given in Table I.

Table I compares the composition of an antiabrasive band of the invention (I) with that of a conventional antiabrasive band (C). The numerical values in Table I indicate the amounts of each component, expressed in phr.

TABLE I

|  | C | I |
| --- | --- | --- |
| NR | 60 | 60 |
| BR | 40 | 40 |
| N375 | 82 |  |
| N234 |  | 40 |
| Stearic acid | 2 | 2 |
| ZnO | 3.5 | 3.5 |
| Resorcinol |  | 2 |
| HMMM |  | 2.01 |
| Oil | 16 |  |
| Antioxidants | 2.9 | 2.9 |
| Process additives | 3 | 3 |
| Accelerating agents | 1.4 | 1.4 |
| Sulphur | 2.51 | 2.51 |

The physical characteristics of the two compounds C and I are given in Table II below.

TABLE II

|  | Band C | Band according to the invention |
| --- | --- | --- |
| Mooney viscosity ML(1 + 4) at 100° C. | >200 | 68.7 |
| IRHD 23° C. | 80.1 | 79.3 |
| IRHD 100° C. | 73.9 | 73.4 |
| E' 23° C. (MPa) | 9.62 | 8.83 |
| E' 70° C. (MPa) | 8 | 7.65 |
| E' 100° C. (MPa) | 7.68 | 7.37 |
| tan δ 23° C. | 0.239 | 0.139 |
| tan δ 70° C. | 0.174 | 0.103 |
| tan δ 100° C. | 0.147 | 0.09 |
| DIN abrasion (mm$^3$) | 25.5 | 50.9 |

Table II shows that the storage modulus E' of the band compound of the invention (I) at high temperatures is substantially equal to that of the conventional compound (C), whereas the hysteresis (tan δ) is much smaller.

The abrasion value on a laboratory test sample, which appears to be very negative for the compound of the invention (almost twice as many cubic millimetres are abraded), was not found to be significant in the fatigue tests carried out on the tyre. Specifically, it was found that both tyres, that of the invention and the conventional tyre, exceed the minimum endurance limit in fatigue tests (>120 h). Indeed, the fatigue tests described below gave a result of 155 hours for the tyre of the invention and 121 hours for the reference tyre. It should also be noted that, in both cases, the end of the test was not as a result of the antiabrasive band yielding.

The reasons for such a surprising difference between the result of the abrasion test and that of the fatigue test have not yet been fully clarified. However, without being in any way bound by the following hypothesis, the inventors believe that the low hysteresis values (tan δ and E") of the antiabrasive band of the invention bring about a reduction in the heating to which said band is subjected during the exercise, with a consequent reduction in the phenomena of thermal degradation, so as largely to compensate for the reduced wear resistance.

In addition, another advantage of the band compound of the invention (I) is that, although it contains no oil, it has a viscosity which is appreciably smaller than that of the conventional band compound (C) and thus has much better workability, particularly during the extrusion stage.

The tyre of the invention was compared with an identical tyre of conventional type, the only difference being the composition of the band compound (Table I).

The size of both tyres was of 195/65 R15 type.

The tyres were subjected to a series of standard tests to evaluate their rolling resistance, fatigue strength and road performance qualities: soft handling (driving under normal conditions), hard handling (driving under extreme conditions) and comfort.

The rolling resistance was evaluated in accordance with ISO standard 8767 and in particular with the "Torque Method" given in point 7.2.2 of the said standard, using conventional laboratory apparatus.

The measurements were taken at a constant velocity equal to 80 km/h, while the parasitic losses were measured according to the "Skim Reading" method given in point 6.6.1 of the abovementioned ISO standard 8767.

In order to compare the performance qualities of the tyre of the invention with those of the comparative tyre, a rolling resistance index of 100 was assigned to the power loss in kg/ton measured in the case of the reference tyres.

The index of the tyre of the invention was then given a % increase corresponding to the drop in power loss encountered during the test. In other words, the higher the value of the index, the lower the rolling resistance of the tyre under examination.

The fatigue strength was tested on a 195/65 R15 tyre with an inflation pressure of 2.5 bar, an applied load of 1135 kg and a rotational speed of 60 km/hour. The test was stopped when ruptures and/or detachment of at least one component of the tyre were encountered.

For the reference tyre, the test was stopped after 121 hours, while the tyre according to the invention withstood the test for 155 hours. No yielding of the antiabrasive band was observed in either of the two tyres.

The evaluation of the performance qualities in terms of comfort, road-holding under normal conditions (soft handling) and under extreme conditions (hard handling) was carried out at the test track in the locality of Vizzola, with the tyres mounted on 1600 cm$^3$ Audi A3 motor vehicles. The conventional tyre and the tyre of the invention were tested by a pair of independent test drivers who then gave a point score from 0 to 10 based on their subjective opinion as regards the road-holding and comfort under both soft handling and hard handling conditions. In this context, the expression "hard handling" means the execution, by the test driver, of all the manoeuvres which an average driver might be forced to carry out in the case of unforeseen and hazardous circumstances: sharp steering at high speed, sudden changing of lanes to avoid obstacles, sudden braking and the like.

In this case also, the overall score given to the conventional tyre with respect to soft handling, hard handling and comfort was equal to an index of 100.

The index of the tyre of the invention was then given a % increase corresponding to the increased performance, in terms of handling and comfort, encountered during the test. In other words, the higher the value of the index, the better the performance qualities offered by the tyre of the invention.

The results thus obtained are given in Table III

TABLE III

|  | Tyre C | Tyre I |
| --- | --- | --- |
| Soft handling | 100 | 100 |
| Hard handling | 100 | 100 |
| Comfort | 100 | 103 |
| R.R. | 100 | 104 |

The data in Table III show that the R.R. of the tyre of the invention is less, by about 4%, compared to that of the conventional tyre, while the road handling properties are substantially equivalent.

What is claimed is:

1. A tyre for a vehicle wheel, comprising:
   at least one carcass ply; and
   a pair of beads;
   wherein a first edge of the at least one carcass ply is folded externally around one or more first bead wires,
   wherein a second edge of the at least one carcass ply is folded externally around one or more second bead wires,
   wherein each bead comprises:
     one or more respective bead wires;
     a bead filling; and
     an antiabrasive band;
   wherein the antiabrasive band is a vulcanized elastomeric compound comprising at least one natural or synthetic rubber,
   wherein a value of a loss factor of the compound at 70° C. is less than or equal to 0.130,
   wherein a value of a storage modulus of the compound at 70° C. is greater than or equal to 6 MPa,
   wherein the compound further comprises a thermosetting resin, and
   wherein the thermosetting resin comprises resorcinol and methylene-donor compound resins, epoxy resins, alkyd resins, or mixtures thereof.

2. The tyre of claim 1, wherein the value of the loss factor of the compound at 70° C. is greater than or equal to 0.05 and less than or equal to 0.120.

3. The tyre of claim 1, wherein the value of the loss factor of the compound at 70° C. is greater than or equal to 0.08 and less than or equal to 0.110.

4. The tyre of claim 1, wherein the value of the storage modulus of the compound at 70° C. is greater than or equal to 6.5 MPa and less than or equal to 18 MPa.

5. The tyre of claim 1, wherein the value of the storage modulus of the compound at 70° C. is greater than or equal to 7 MPa and less than or equal to 12 MPa.

6. The tyre of claim 1, wherein the compound further comprises carbon black in an amount less than or equal to 60 phr.

7. The tyre of claim 1, wherein the compound further comprises carbon black in an amount less than or equal to 50 phr.

8. The tyre of claim 1, wherein the compound comprises the thermosetting resin in an amount greater than or equal to 0.5 phr and less than or equal to 15 phr.

9. The tyre of claim 1, wherein the thermosetting resin is cured in situ.

10. A tyre for a vehicle wheel, comprising:
    at least one carcass ply; and
    a pair of beads;
    wherein a first edge of the at least one carcass ply is folded externally around one or more first bead wires,
    wherein a second edge of the at least one carcass ply is folded externally around one or more second bead wires,
    wherein each bead comprises:
      one or more respective bead wires;
      a bead filling; and
      an antiabrasive band;
    wherein the antiabrasive band is a vulcanized elastomeric compound comprising at least one natural or synthetic rubber,
    wherein a value of a loss factor of the compound at 70° C. is less than or equal to 0.130,
    wherein a value of a storage modulus of the compound at 70° C. is greater than or equal to 6 MPa,
    wherein the compound further comprises a thermosetting resin, and
    wherein the thermosetting resin comprises:
      resorcinol; and
      a methylene donor.

11. The tyre of claim 10, wherein the methylene donor is hexamethoxymethylmelamine (HMMM) or hexamethylenetetramine (HMT).

12. The tyre of claim 10, wherein the compound comprises the thermosetting resin in an amount greater than or equal to 0.5 phr and less than or equal to 15 phr.

13. The tyre of claim 10, wherein the thermosetting resin is cured in situ.

14. An antiabrasive band of a vulcanized elastomeric compound comprising at least one natural or synthetic rubber,
    wherein a value of a loss factor of the compound at 70° C. is less than or equal to 0.130,
    wherein a value of a storage modulus of the compound at 70° C. is greater than or equal to 6 MPa,
    wherein the compound further comprises a thermosetting resin, and
    wherein the thermosetting resin comprises resorcinol and methylene-donor compound resins, epoxy resins, alkyd resins, or mixtures thereof.

15. The band of claim 14, wherein the value of the loss factor of the compound at 70° C. is greater than or equal to 0.05 and less than or equal to 0.120.

16. The band of claim 14, wherein the value of the loss factor of the compound at 70° C. is greater than or equal to 0.08 and less than or equal to 0.110.

17. The band of claim 14, wherein the value of the storage modulus of the compound at 70° C. is greater than or equal to 6.5 MPa and less than or equal to 18 MPa.

18. The band of claim 14, wherein the value of the storage modulus of the compound at 70° C. is greater than or equal to 7 MPa and less than or equal to 12 MPa.

19. The band of claim 14, wherein the compound further comprises carbon black in an amount less than or equal to 60 phr.

20. The band of claim 14, wherein the compound further comprises carbon black in an amount less than or equal to 50 phr.

21. The band of claim 14, wherein the compound comprises the thermosetting resin in an amount greater than or equal to 0.5 phr and less than or equal to 15 phr.

22. The band of claim 14, wherein the thermosetting resin is cured in situ.

23. An antiabrasive band of a vulcanized elastomeric compound comprising at least one natural or synthetic rubber, wherein a value of a loss factor of the compound at 70° C. is less than or equal to 0.130,
wherein a value of a storage modulus of the compound at 70° C. is greater than or equal to 6 MPa,
wherein the compound further comprises a thermosetting resin, and
wherein the thermosetting resin comprises:
resorcinol; and
a methylene donor.

24. The band of claim 23, wherein the methylene donor is HMMM or HMT.

25. The band of claim 23, wherein the compound comprises the thermosetting resin in an amount greater than or equal to 0.5 phr and less than or equal to 15 phr.

26. The band of claim 23, wherein the thermosetting resin is cured in situ.

* * * * *